United States Patent
Wang

(10) Patent No.: US 9,914,331 B2
(45) Date of Patent: Mar. 13, 2018

(54) EXPLOSION-PROOF TIRE

(71) Applicant: Li Wang, Liaoning (CN)

(72) Inventor: Li Wang, Liaoning (CN)

(*) Notice: Subject to any disclaimer, the term of this patent is extended or adjusted under 35 U.S.C. 154(b) by 323 days.

(21) Appl. No.: 14/784,925

(22) PCT Filed: Sep. 11, 2013

(86) PCT No.: PCT/CN2013/083272
§ 371 (c)(1),
(2) Date: Oct. 15, 2015

(87) PCT Pub. No.: WO2014/183359
PCT Pub. Date: Nov. 20, 2014

(65) Prior Publication Data
US 2016/0075191 A1    Mar. 17, 2016

(30) Foreign Application Priority Data
May 14, 2013   (CN) .......................... 2013 1 0178165

(51) Int. Cl.
*B60C 5/02*      (2006.01)
*B60C 5/20*      (2006.01)
(Continued)

(52) U.S. Cl.
CPC ................ *B60C 17/02* (2013.01); *B60C 5/22* (2013.01); *B60C 17/01* (2013.01); *B60C 19/00* (2013.01); *B60C 2019/004* (2013.01)

(58) Field of Classification Search
CPC .... B60C 5/00; B60C 5/02; B60C 5/20; B60C 5/22; B60C 19/00; B60C 19/12
See application file for complete search history.

(56) References Cited

U.S. PATENT DOCUMENTS

| 2005/0109439 A1 | 5/2005 | Droegemueller |
| 2011/0030867 A1 | 2/2011 | Kyle |
| 2012/0048442 A1* | 3/2012 | Kyle ....................... B60C 17/02 |
| | | 152/518 |

FOREIGN PATENT DOCUMENTS

| CN | 102529600 | * | 7/2012 |
| CN | 201010620637 | | 7/2012 |

(Continued)

OTHER PUBLICATIONS

International Search Report for PCT/CN2013/083272 dated Jan. 10, 2014.

*Primary Examiner* — Justin R Fischer
(74) *Attorney, Agent, or Firm* — Schmeiser, Olsen & Watts, LLP

(57) ABSTRACT

The present invention relates to an explosion-proof tire, comprising a safety airbag, trigger sensors and a safety switch, wherein the safety airbag is arranged between a tire and a hub; the hub is provided with grooves; trigger devices of the safety airbag are arranged in the grooves; one end of each trigger sensor sticks into the tire; and the other end thereof is connected with a trigger device. The safety switch is arranged on the valve stem of the tire; and positive and negative electrodes on the valve stem are each connected with a trigger device.

The safety switch disclosed by the present invention ensures that the safety airbag will not be triggered accidentally, and when a vehicle tire bursts, the safety airbag provided can instantly provide enough support force to ensure traffic safety.

6 Claims, 2 Drawing Sheets

(51) Int. Cl.
*B60C 5/22* (2006.01)
*B60C 19/12* (2006.01)
*B60C 17/02* (2006.01)
*B60C 17/01* (2006.01)
*B60C 19/00* (2006.01)

(56) References Cited

FOREIGN PATENT DOCUMENTS

| | | | |
|---|---|---|---|
| CN | 201210155973 | | 9/2012 |
| CN | 201310178165 | | 8/2013 |
| CN | 201320263118 | | 10/2013 |
| GB | 2329160 | * | 3/1999 |
| JP | 2004-330985 | * | 11/2004 |

* cited by examiner

EXPLOSION-PROOF TIRE

FIELD OF THE INVENTION

The present invention relates to a tire, and in particular relates to an explosion-proof tire.

BACKGROUND OF THE INVENTION

The explosion-proof tire is formally called 'run-flat tire'. The wall of an inflated tire is the main area for supporting vehicle weight. Particularly, some tires high in aspect ratio (the ratio of the height to the width of a tire) have 'thick' walls. When 'bursting' seriously, such a tire usually breaks apart in a second, so that the tire instantly loses the support force and thus the gravity center of the vehicle immediately changes. Particularly after a front wheel tire of a front wheel drive vehicle bursts, the instantaneous transferring of the gravity center will make the vehicle out of control. If the driver does not have the driving experience after a tire bursts, which most people do not have, he may likely do wrong driving action, for example slamming the brakes on, which will make the vehicle out of control irretrievably. Tire burst is a very serious safety accident, especially on highways. According to statistics, 70% of the domestic unforeseen highway traffic accidents are caused by a burst tire, and the mortality rate is close to 100% due to a burst tire at a speed of more than 160 km. The current explosion-proof tire is mostly formed by thickening on both sides of the rubber tread or adding the supporting device. Once a tire burst, since the bearing surface is very small and the pressure is great, the support force is not enough, the effect is not so good, and the elasticity of the original tire is damaged, so that the damping performance becomes poorer.

SUMMARY OF THE INVENTION

In view of the foregoing shortcomings of the prior art, the present invention provides a more safe and reliable explosion-proof tire.

To achieve the above objective, the technical solution adopted in the present invention is as follows: an explosion-proof tire, including a safety airbag, trigger sensors and a safety switch, wherein the safety airbag is arranged between a tire and a hub; the hub is provided with grooves; trigger devices of the safety airbag are arranged in the grooves; one end of each trigger sensor sticks into the tire; and the other end thereof is connected with a trigger device. The safety switch is arranged on the valve stem of the tire; and positive and negative electrodes on the valve stem are each connected with a trigger device.

Preferably, the safety switch is a nut on the valve stem.

Preferably, the upper end of the airbag is provided with a protection cover, and the protection cover is made of rubber material.

Preferably, each side of the hub is provided with a protection plate.

Preferably, the number of the grooves is three and the three grooves are distributed uniformly on the hub; and the power source of the three trigger devices is a parallel circuit. Once one or two fail, the remaining trigger device can still trigger the safe airbag, playing the role of triple insurance.

The safety switch disclosed by the present invention ensures that the safety airbag will not be triggered accidentally, and when a tire of the vehicle bursts, the safety airbag provided can instantly provide enough support force to ensure traffic safety.

DETAILED DESCRIPTION OF THE EMBODIMENTS

Figure 1:
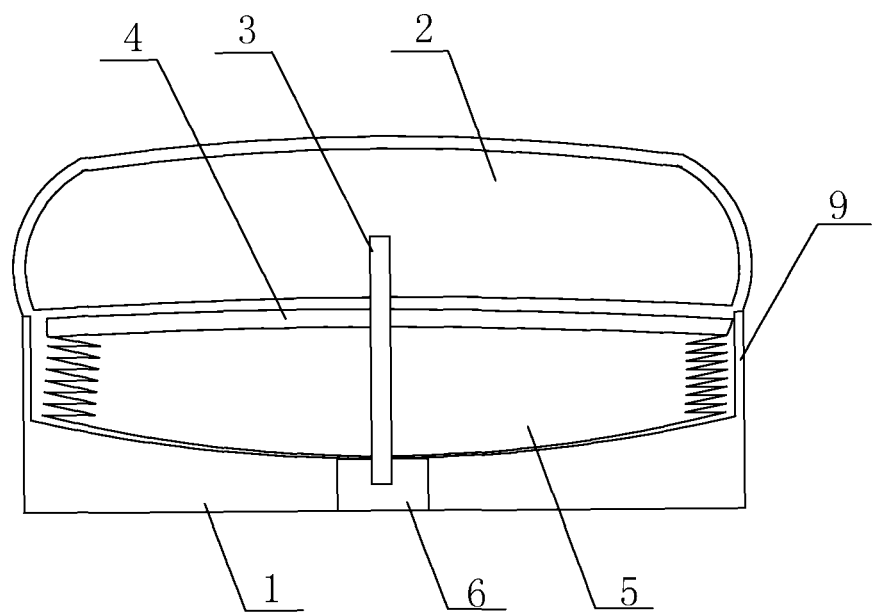
FIG. 1 is a structural schematic diagram of the present invention.
Figure 2:
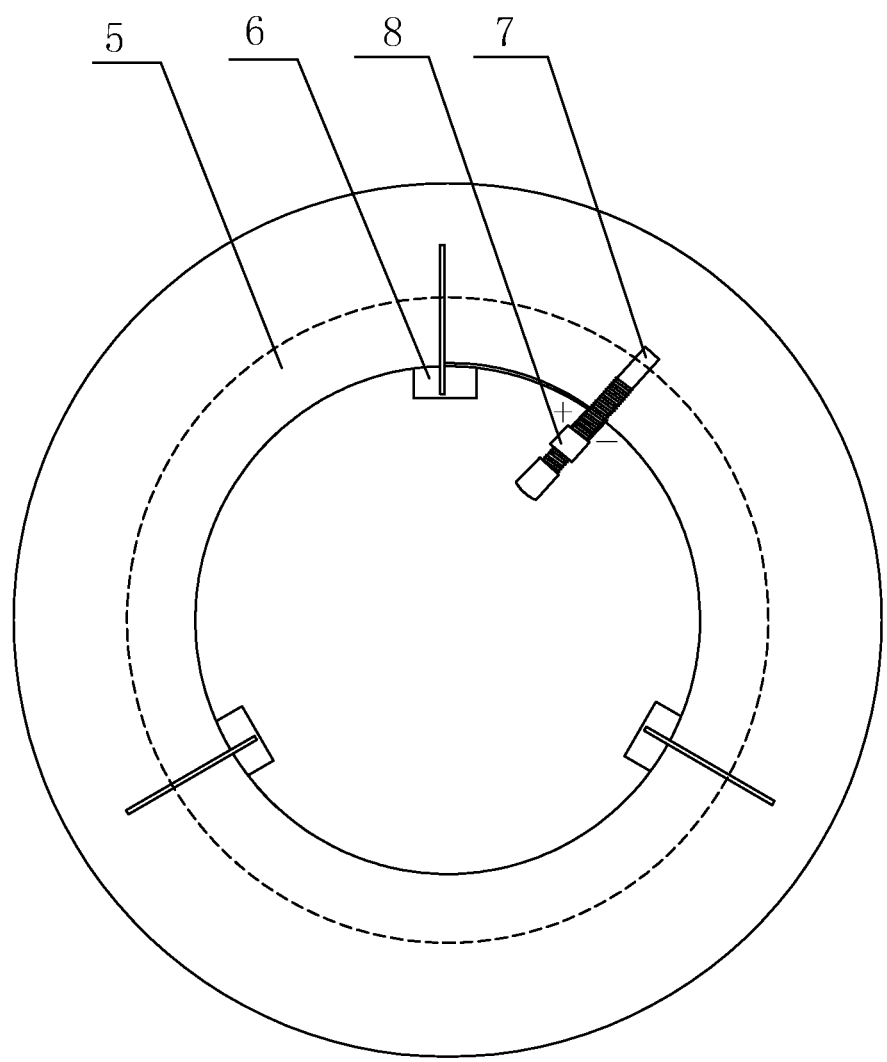
FIG. 2 is a side view of the present invention.

As shown in FIGS. 1 and 2, the explosion-proof tire includes a safety airbag 5, trigger sensors 3 and a safety switch 8, wherein the safety airbag 5 is arranged between a tire 2 and a hub 1; and the hub 1 is provided with three grooves 6 which are distributed uniformly on the hub 1. Triggering devices of the safety airbag 5 are arranged in the grooves 6; one end of each trigger sensor 3 sticks into the tire 2; and the other end thereof is connected with a trigger device. The height of each trigger sensor 3 is the one corresponding to the minimum pressure critical value: when the pressure is suddenly reduced to the critical value, the inner wall of the tire touches a trigger sensor 3, thus triggering a trigger device, in which case the safety airbag 5 inflates, and provides the tire 2 with temporary pressure, so as to ensure vehicle safety. The safety airbag 5 is arranged in the hub 1 in an enfoldment manner with the airtight ensured. The safety switch 8 of the safety airbag is arranged on the tire valve stem 7 on which positive and negative electrodes are located at the halfway point of the threaded section thereof and each is connected with a trigger device. The upper end of the airbag 5 is provided with a protection cover 4 which is made of rubber material, and which can protect the safety airbag 5 when the tire bursts. The two sides of the valve stem 7 are positive and negative electrodes of the power supply, the safety switch 8 is a nut on the valve stem, the circuit is in the OFF state when the nut is turned backward, and the circuit is in the ON state when the nut is turned forward. Each trigger device can be controlled by the safety switch 8 which is unscrewed when it is necessary to use the explosion-proof function. When it is unnecessary to use the explosion-proof function, the safety switch is disconnected, which can prevent the airbag from being triggered on an ordinary bumpy road. Each side of the hub 1 is provided with a protection plate 9, namely, it is heightened, so as to prevent the safety airbag 5 from being damaged when the tire is removed from the hub.

The invention claimed is:

1. An explosion-proof tire assembly, comprising a tire having a valve stem, a hub, safety airbag, trigger sensors and a safety switch, wherein the safety airbag is arranged between tire and the hub;
   the hub is provided with grooves; trigger devices of the safety airbag are arranged in the grooves;
   one end of each trigger sensor sticks into the tire, the other end thereof is connected with a trigger device;
   the safety switch is arranged on the valve stem of the tire; and positive and negative electrodes on the valve stem are each connected with a trigger device.

2. The explosion-proof tire of claim 1, wherein the airbag has an upper end which is provided with a protection cover; and the protection cover is made of rubber material.

3. The explosion-proof tire of claim 1, wherein each side of the hub is provided with a protection plate.

4. The explosion-proof tire of claim 1, wherein the number of the grooves is three and the three grooves are distributed uniformly on the hub.

5. The explosion-proof tire of claim 4, further comprising a power source for operating the trigger devices, which power sources is a parallel circuit.

6. The explosion-proof tire of claim 1, further comprising power sources for operating the trigger devices, which power sources is a parallel circuit.

\* \* \* \* \*